3,375,166
METHODS OF PROLONGED INFLAMMATORY TREATMENT
Robert E. Harman, Avenel, Frederick A. Kuehl, Jr., Rumson, Robert G. Strachan, Summit, and Ralph F. Hirschmann, Scotch Plains, N.J., assignors to Merck & Co., Inc., Rahway, N.J., a corporation of New Jersey
No Drawing. Original application July 18, 1963, Ser. No. 296,111, now Patent No. 3,285,935, dated Nov. 15, 1966. Divided and this application Sept. 14, 1965, Ser. No. 510,999
3 Claims. (Cl. 167—65)

This application is a division of our copending application Ser. No. 290,111, filed July 18, 1963, now U.S. Patent 3,285,935, granted Nov. 15, 1966.

This invention relates to new indolyl acid derivatives and to a method for the prolonged localized treatment of inflammation. More specifically, this invention relates to the glucuronides of 1-p-chlorobenzoyl-2-methyl-5-methoxy-3-indolyl acetic acid and to the lower alkyl esters of per-lower alkanoylated glucuronides of the said indolyl acid. More specifically also, it relates to a method for the prolonged localized treatment of inflammation which comprises the localized administration of these compounds.

The treatment of inflammation by chemotherapeutic agents has advanced a great distance in the last decade and a half, with the development of many new chemotherapeutic agents such as the steroids and the like. Recently, a new and very powerful drug has been added to the list known as Indomethacin, chemically 1-p-chlorobenzoyl-2-methyl-5-methoxy-3-indolyl acetic acid. Like many other drugs this is a systemic medicine which is administered orally and passes into the blood stream for general distribution in the body. This presents certain disadvantages, under some circumstances. One such disadvantage is that a large amount of the drug becomes inactivated by metabolic processes over a period of time and passes out through the body excretions. Another disadvantage to this method of administering Indomethacin, is that the duration of the drug's effect is not too long and repeated periodic administrations are necessary. Furthermore, it is at times desirable to get a localized treatment with the drug applied only to the inflamed area, rather than waste it over the entire body.

We have found that certain carbohydrate derivatives of Indomethacin which are inactive systemically, are transformed in situ by metabolic processes very slowly into Indomethacin with the result that prolonged local treatment of inflammation is possible. These carbohydrate derivatives comprise the glucuronide of Indomethacin which is itself the deactivating metabolic product by which Indomethacin is excreted from faces of some species and the alkyl esters of the trialkanoylated glucuronide of Indomethacin, which are preparable either synthetically or from the metabolic product itself.

It is an advantage of these above products that, with their use, the method of our invention permits localized treatment of inflammation. Such localized treatment puts the drug where it is needed and not systemically throughout the whole body and is thus far less wasteful of this drug. It is a further advantage of our invention that slow prolonged treatment is possible, again permitting economies in the use of the drug.

The glucuronide of Indomethacin is the metabolite by which Indomethacin is excreted from some species of animal (other species excrete other derivatives). When the glucuronide is treated with diazomethane to produce the corresponding methyl ester and then acetylated there is formed the methyl ester of the triacetylglucuronide of Indomethacin. This same compound can be obtained from bromo triacetylglucuronic acid and the potassium salt of Indomethacin in acetone. When diazoethane, diazopropane or diazobutane are used, the corresponding other lower alkyl esters such as the ethyl, propyl and butyl esters are obtained. Similarly, instead of using acetic anhydride, acylation can be carried out with propionic anhydride, butyric anhydride or the like to produce the corresponding lower alkanoylated glucuronic acid derivatives. These equivalent derivatives are similarly usable in our invention.

The key to this invention is the presence of an enzyme known as β-glucuronidase in mammalian tissue (Bollet, Goodwin, and Brown, J. Clin. Invest., 38, 451, 1959) as well as the presence of other esterases in synovial fluid. Although systemic administration of the glucuronides alkanoylated alkyl esters causes elimination through the kidneys, over a relatively short period of time, local application of the glucuronide or its derivative permits a slow release of free Indomethacin through the action of these esterases. The drug is thus used very efficiently and its effect is felt over a prolonged period.

The glucuronide of Indomethacin or its acylated esters can be applied, either topically or by injection. The glucuronide itself is especially useful in an aqueous carrier, whereas the acylated esters are useful in fat or oily carriers.

Our invention can be illustrated by the following examples:

*Example 1.—Indomethacin glucuronide*

A rabbit is dosed orally (stomach tube) with 518.5 mg. of Indomethacin (1-p-chlorobenzoyl-2-methyl-5-methoxy-3-indolyl acetic acid) containing 11 μc. of Indomethacin-2-$C^{14}$. One g. of ammonium chloride is administered intraperitoneally in order to maintain the urine pH near 7. Drug and ammonium chloride are given in two equal doses at times 0 and 12 hours. One-half (108 ml., $5.2 \times 10^6$ c.p.m.) of the first 24-hour urine is adjusted to pH 5.0 and extracted with four 100-ml. volumes of benzene to remove much of the unconjugated metabolites. The residual urine is then adjusted to pH 2.0 and extracted with ethyl acetate. Water (50 ml.) is added to the combined extracts and the organic solvent removed in vacuo on a rotating concentrator. The residual aqueous solution is adjusted to pH 6.6 and lyophilized to give 318.5 mg. of brown gum which contains 80% of the radioactivity in the original urine. Paper chromatography in a system comprising 2 methanol:1 water:1 n-butylalcohol:1 benzene revealed the presence of 5-methoxy-2-methylindole-3-acetic acid and the glucuronides of Indomethacin and 5-methoxy-2-methylindole-3-acetic acid.

A 60-tube countercurrent distribution apparatus with lower phase capacity 3 ml. per tube is prepared. The solvent system is made by equilibration of 400 ml. of 0.5 M phosphate buffer (pH 6.6; equal volumes of 0.5 M $Na_2HPO_4$ and 0.5 M $NaH_2PO_4$), 328 ml. of ethyl acetate and 72 ml. of sec. butyl alcohol. The upper phase proportioning device is adjusted to deliver 3 ml. per cycle. The entire 318.5 mg. of crude glucuronide is dissolved in 6 ml. of lower phase, introduced into the first two tubes and a total of 75 transfers carried out. Scintillation counting of selected fractions shows that the distribution has yielded three radioactive zones. Paper chromatographic analysis and ultraviolet spectra serves to identify the metabolites. Material near the organic solvent end of the system contains 2-methyl-5-methoxy-3-indolyl acetic acid, and the polar material (tubes 0–3) is the crude glucuronide of this compound which is reserved for isolation of that substance. Indomethacin glucuronide has concentrated at about tube 29.

Tubes 16–34 are combined on the basis of radioactivity. The phases are separated and the aqueous layer adjusted to pH 2.2 with hydrochloric acid. The phases are then recombined and three extractions with 15 ml. portions of ethyl acetate carried out. Solvent is removed from the extract in vacuo and the residue is dissolved in water, adjusted to pH 6.0 and lyophilized. There results 45.5 mg. of white granular material that shows the ultraviolet maximum at 320 m$\mu$ characteristic of Indomethacin. The fraction contains $1.2 \times 10^6$ c.p.m. and thus represented 28% of the original label. A single peak at $R_f$ 0.75 is observed on chromatography in a system comprising 2 methanol:1 water:1-n-butanol:1 benzene, and chromatographic analysis using a system comprising 8 isopropanol:15 N $NH_4OH$:1 water in combination with the above system after treatment with β-glucuronidase shows complete conversion to Indomethacin. Final proof of structure is secured by conversion of the crude glucuronide to the crystalline triacetyl methyl ester, which is identified by comparison with a synthetic sample of the triacetyl methyl ester of Indomethacin glucuronide.

*Example 2*

Five grams (0.014 mole) of 1-p-chlorobenzoyl-2-methyl-5-methoxy-3-indolyl acetic acid is suspended in 15 ml. of anhydrous methanol and 32.8 ml. of a solution of 0.427 N (0.014 eq.) of potassium-t-butoxide in t-butyl alcohol is added dropwise. The solid slowly dissolves and at the end of the addition the solution is clear and the pH is neutral. The yellow solution is concentrated to dryness in vacuo, dissolved in the minimum amount of refluxing acetone, cooled to room temperature and placed in the refrigerator overnight. The reultant crystals are filtered, washed with a small amount of cold acetone and dried yielding 4.2 grams of the potassium salt of Indomethacin. A four gram aliquot (0.0101 mole) of this salt is dissolved in the minimum amount of refluxing acetone and the resulting solution is treated with 4.1 grams (0.0103 mole) of methyl-(tri-O-acetyl-α-D-glucopyranosylbromide)uronate dissolved in acetone. The solution is refluxed for two hours in a nitrogen atmosphere. The color of the solution changes from yellow to maroon. After standing at room temperature overnight, the solution is concentrated to dryness and the residue is dissolved in methylene chloride. The solution is filtered, extracted 3 times with an equal volume of a saturated solution of sodium bicarbonate, with $H_2O$ and then is dried over $MgSO_4$. The dried methylene chloride solution is concentrated to yield a viscous yellow colored oil. The oil is crystallized from ether-n-hexane to yield 2.0 grams of Indomethacin glucuronide triacetyl methyl ester, M.P. 150–151° C.

1755 cm.$^{-1}$, 1673 cm.$^{-1}$ (c.=O), 1585 cm.$^{-1}$ (aromatic) and 1200–1235 cm.$^{-1}$. Analysis calculated for

C, 57.79; H, 4.85; N, 2.11; Cl, 5.33. Found: C, 57.71; H, 4.59; N, 2.06; Cl. 5.12.

*Example 3.—Indomethacin glucuronide triacetyl methyl ester*

A 16.4 mg. sample of crude Indomethacin glucuronide sodium salt, isolated from urine as described above in Example 1, is dissolved in 3.0 ml. of water and the pH is adjusted to 2.1 with hydrochloric acid. The resulting suspension is extracted with four 5 ml. portions of ethyl acetate and the extracts combined to yield 13.5 mg. of the free acid as an amorphous yellow solid. This material is dissolved in 1 ml. of methanol and treated with excess ethereal diazomethane. After one hour at 25°, the solvent is removed in a stream of nitrogen and the amorphous crude methyl ester dried in vacuum. On-half ml. of pyridine and ½ ml. of acetic anhydride are added to the crude ester and the solution is held at 25° overnight. The acetylation mixture is then poured into 5 ml. of water, allowed to stand at 25° a further hour, and the acetylated ester of Indomethacin glucuronide filtered off and dried in vacuum.

The crude ester is chromatographed on silica gel by the thin layer technique, the plate being developed with ethyl acetate. Partially purified ester ($R_f$ 0.83) recovered by elution with ethyl acetate, is re-chromatographed using chloroform as the developer. The ester, $R_f$ 0.05, is eluted with ethyl acetate and crystallized from ether-hexane. It has a M.P. 144–5°, unchanged upon admixture with authentic Indomethacin glucuronide triacetyl methyl ester prepared in Example 2 and the infrared spectra of the two samples are identical.

*Example 4.—Topical ointment No. 1*

| | Percent |
|---|---|
| Indomethacin glucuronide | 1 |
| White beeswax | 5 |
| Wool fat, anhydrous | 20 |
| Mineral oil, heavy | 5 |
| White petroleum, q.s. 100. | |

Levigate the Indomethacin glucuronide with a portion of the mineral oil. Melt the remaining ingredients separately on a steam bath and combine with the remaining mineral oil, which also has been heated, and stir until cool. Incorporate the levigated solid into the cooled base and pass through a roller mill several times.

*Example 5.—Topical ointment No. 2*

| | Percent |
|---|---|
| Indomethacin glucuronide | 1 |
| Mineral oil | 30 |
| Petrolatum, white, q.s. 100. | |

Melt the petrolatum on a steam bath, add the mineral oil, and stir until cool. Levigate the Indomethacin glucuronide with a portion of the base. Incorporate the remainder of the base and pass the entire formulation through a roller mill several times.

*Example 6.—Topical cream*

| | Percent |
|---|---|
| Indomethacin glucuronide | 1 |
| Stearyl alcohol | 4.5 |
| Cetyl alcohol | 5.0 |
| Mineral oil | 10.0 |
| Myrj 52 | 5.0 |
| Antifoam emulsion AF | 0.1 |
| Sorbitol solution 70% | 15.0 |
| Methyl paraben | 0.15 |
| Sorbic acid | 0.10 |
| Citric acid | 0.25 |
| Sodium citrate | 1.0 |
| Distilled water, q.s. 100.0. | |

Heat the stearyl alcohol, cetyl alcohol, mineral oil, Myrj 52, and antifoam emulsion AF to 75–80° C. Dissolve the remaining ingredients (except the Indomethacin glucuronide) in the water and heat to 80–85° C. Add the aqueous phase to the oil phase with stirring. Stir until cool. Levigate the solid with a portion of the base. Incorporate the remainder of the base and pass through a roller mill several times.

We claim:
1. A method of prolonged localized treatment of inflammation which comprises the topical administration to a mammal of a compound selected from the group consisting of the glucuronide of 1-p-chlorobenzoyl-2-methyl-5-methoxy-3-indolyl acetic acid and the lower alkyl esters of per-lower alkanoylated glucuronide of 1-p-chlorobenzoyl-2-methyl-5-methoxy-3-indolyl acetic acid.

2. The method of claim 1 in which the compound administered is the glucuronide of said indolyl acid.

3. The method of claim 1 in which the compound administered is the methyl ester of the triacetylglucuronide of said indolyl acid.

References Cited

UNITED STATES PATENTS

| | | | |
|---|---|---|---|
| 3,127,413 | 3/1964 | Gray | 260—319 |
| 3,133,083 | 5/1964 | Hestin | 260—319 |
| 3,143,465 | 8/1964 | Keating | 167—65 |
| 3,156,619 | 11/1964 | Bertin et al. | 167—65 |

ALBERT T. MEYERS, *Primary Examiner.*

S. J. FRIEDMAN, *Assistant Examiner.*